United States Patent
Delorme et al.

(10) Patent No.: US 9,403,471 B2
(45) Date of Patent: Aug. 2, 2016

(54) VEHICLE SYSTEM

(71) Applicants: Allan R. Delorme, Drayton Valley (CA); Jonathan M. Dusterhoft, Drayton Valley (CA)

(72) Inventors: Allan R. Delorme, Drayton Valley (CA); Jonathan M. Dusterhoft, Drayton Valley (CA)

(*) Notice: Subject to any disclaimer, the term of this patent is extended or adjusted under 35 U.S.C. 154(b) by 125 days.

(21) Appl. No.: 14/051,997

(22) Filed: Oct. 11, 2013

(65) Prior Publication Data

US 2015/0102582 A1  Apr. 16, 2015

(51) Int. Cl.
*B60P 3/10* (2006.01)
*B60P 1/04* (2006.01)
*B63B 7/04* (2006.01)
*B63B 7/00* (2006.01)
*B63C 13/00* (2006.01)

(52) U.S. Cl.
CPC .............. *B60P 3/1033* (2013.01); *B60P 1/04* (2013.01); *B60P 3/10* (2013.01); *B63B 7/04* (2013.01); *B63C 13/00* (2013.01); *B63B 2007/003* (2013.01)

(58) Field of Classification Search
CPC ........... B60P 3/1033; B63B 7/02; B63B 7/04; B63B 2007/003
See application file for complete search history.

(56) References Cited

U.S. PATENT DOCUMENTS

| | | | | |
|---|---|---|---|---|
| 1,560,983 A | * | 11/1925 | Gibbs et al. | 114/344 |
| 2,287,055 A | * | 6/1942 | Olson | 296/157 |
| 2,422,930 A | * | 6/1947 | Rutledge | B63B 7/04 |
| | | | | 114/353 |
| 2,518,091 A | * | 8/1950 | Stopkevyc | 114/266 |
| 2,659,464 A | * | 11/1953 | Sweetman | 190/1 |
| 2,835,401 A | * | 5/1958 | Byrd | B60P 3/1033 |
| | | | | 414/484 |
| 2,965,061 A | * | 12/1960 | Bank | B63B 1/18 |
| | | | | 114/290 |
| 3,057,492 A | * | 10/1962 | Chrystler | B60P 3/1033 |
| | | | | 280/124.157 |
| 3,097,371 A | * | 7/1963 | Rough | 114/344 |
| 3,574,388 A | | 4/1971 | Stone | |
| 3,682,337 A | | 8/1972 | May et al. | |
| 3,689,950 A | * | 9/1972 | Jalowiecki | B63C 13/00 |
| | | | | 114/288 |
| 3,755,834 A | * | 9/1973 | Rice | B60P 3/1033 |
| | | | | 114/344 |
| 3,822,427 A | * | 7/1974 | Ewart, Jr. | B63B 7/04 |
| | | | | 114/352 |

(Continued)

FOREIGN PATENT DOCUMENTS

EP  0483030  *  4/1992
FR  002730975 A1  *  8/1996  ............ B63B 7/04

*Primary Examiner* — Joseph Rocca
*Assistant Examiner* — Maurice Williams

(57) ABSTRACT

A vehicle system is disclosed herein. The vehicle system includes first and second shell members, each extending along respective first and second axes between respective stern ends and junction ends. Each shell member also includes respective hull walls extending along the respective axes, interconnecting the respective stern ends and junction ends. Each shell member defines respective volumes of space accessible through respective perimeters. The vehicle system also includes a first hinge assembly interconnecting the first shell member and the second shell member. The first hinge assembly is mounted to the first junction end and to the second junction end. The first hinge assembly effectuates controlled pivoting movement of the first shell member and the second shell member with respect to each other whereby the first shell member and the second shell member are configurable in a first configuration in which the first axis and the second axis are spaced from an parallel to one another and in a second configuration in which the first axis and the second axis are collinear.

17 Claims, 4 Drawing Sheets

(56) References Cited

U.S. PATENT DOCUMENTS

| | | | |
|---|---|---|---|
| 3,940,175 A | 2/1976 | Robison | |
| 3,996,634 A * | 12/1976 | Grind | B63B 3/08 |
| | | | 114/352 |
| 4,180,881 A * | 1/1980 | Speranza | 114/344 |
| 4,223,414 A | 9/1980 | Dickson | |
| 4,273,351 A | 6/1981 | Salamander | |
| 4,366,769 A * | 1/1983 | Lingeman | 114/352 |
| 4,478,167 A * | 10/1984 | Hart | B63B 7/04 |
| | | | 114/352 |
| 4,671,202 A * | 6/1987 | Johnson | B63B 7/04 |
| | | | 114/353 |
| 4,781,392 A | 11/1988 | Cooper | |
| 4,794,876 A * | 1/1989 | Levine | 114/352 |
| 4,827,865 A * | 5/1989 | Yelderman | 114/353 |
| 4,841,900 A * | 6/1989 | Maselko | 114/353 |
| 5,072,963 A | 12/1991 | Avillez de Basto | |
| 5,123,371 A * | 6/1992 | Giordano | B63C 13/00 |
| | | | 114/344 |
| 5,261,346 A * | 11/1993 | Updyke | 114/352 |
| 5,477,804 A * | 12/1995 | Chan | 114/354 |
| 5,515,805 A * | 5/1996 | Johanson | 114/344 |
| 5,868,097 A * | 2/1999 | Spickelmire | B63B 7/04 |
| | | | 114/353 |
| 6,145,465 A | 11/2000 | Murphree | |
| 6,164,238 A | 12/2000 | Stokes | |
| 6,527,336 B2 | 3/2003 | Hernandez et al. | |
| 6,536,846 B1 | 3/2003 | Felty | |
| 6,612,255 B1 * | 9/2003 | Wragg | B63B 7/04 |
| | | | 114/352 |
| 6,662,743 B1 * | 12/2003 | Rolfe | B63B 7/04 |
| | | | 114/344 |
| 6,749,248 B1 | 6/2004 | Votruba et al. | |
| 7,143,713 B1 * | 12/2006 | Richardson | B60P 3/1033 |
| | | | 114/344 |
| 7,258,362 B2 | 8/2007 | Thurm | |
| 7,267,074 B1 * | 9/2007 | Hicks et al. | 114/353 |
| 7,895,962 B2 * | 3/2011 | McLean et al. | 114/352 |
| 8,272,647 B2 * | 9/2012 | Pendl | B62B 19/04 |
| | | | 280/7.12 |
| 8,783,203 B1 * | 7/2014 | Woods | 114/352 |
| 2003/0164604 A1 * | 9/2003 | Fogg | B60P 3/1066 |
| | | | 280/414.1 |
| 2004/0256836 A1 | 12/2004 | MacKarvich | |
| 2006/0152040 A1 | 7/2006 | Wiebe et al. | |
| 2007/0034136 A1 * | 2/2007 | Ager | 114/354 |
| 2007/0188009 A1 * | 8/2007 | Pierce et al. | 298/23 R |
| 2009/0309328 A1 * | 12/2009 | Gionta | B60P 3/11 |
| | | | 280/414.3 |
| 2010/0319742 A1 | 12/2010 | Prusmack | |
| 2012/0013083 A1 * | 1/2012 | Pendl | 280/7.14 |
| 2013/0029547 A1 * | 1/2013 | Suzuki | B63B 35/7916 |
| | | | 441/74 |
| 2014/0246842 A1 * | 9/2014 | Kirchhan | B60P 3/1075 |
| | | | 280/414.1 |

* cited by examiner

VEHICLE SYSTEM

BACKGROUND OF THE INVENTION

1. Field of the Invention

The invention relates to a system in which a boat is provided with wheel or wheeled means for carrying the boat to or from launching sites, the wheel or wheeled means being either attached to the boat or separable from the boat.

2. Description of Related Prior Art

U.S. Pat. No. 6,145,465 discloses a FOLDABLE CAMPER/BOAT/TRAILER SYSTEM AND METHOD. A combination foldable camper/boat/trailer system features flexibility, ease of storage, and ease of assembly. The boat may be tapered so that it forms a more stabilized surface in the water and can prevent inadvertent collapse of the shells from an open position (designated self stabilizing). For additional security, the boat may include a securing element, such as a U-shaped securing element which may span the ends of the shells which abut each other so that the integrity of the water resistant shells is not impaired, a flexible weather resistant covering such as a tent mounted over the boat for use as a camper, may be collapsible and can be stored inside the shells when for instance the shell are in a folded position. The tent may be self-erecting upon opening the shells to an open position, such that it requires minimal effort to position any tent frames and attach the tent to the shells or the shells may be used as a top of the camper, and can be used in conjunction with a specialized trailer which may include extendable or telescoping supports. These supports may support the shells in an open position and may assist in using for instance the shells as a camper mounted on the trailer. The system thus offers a combination camper, boat, hauler, and storage device which may be folded for ease of storage and transportation.

SUMMARY OF THE INVENTION

In summary, the invention is a vehicle system. The vehicle system includes a first shell member extending along a first axis between a first stern end and a first junction end. The first shell member also includes a first hull wall extending along the first axis, interconnecting the first stern end and the first junction end. The first hull wall and the first stern end and the first junction end cooperate to define a first volume of space accessible through a first perimeter. The vehicle system also includes a second shell member extending along a second axis between a second stern end and a second junction end. The second shell member also includes a second hull wall extending along the second axis, interconnecting the second stern end and the second junction end. The second hull wall and the second stern end and the second junction end cooperate to define a second volume of space accessible through a second perimeter. The vehicle system also includes a first hinge assembly interconnecting the first shell member and the second shell member. The first hinge assembly is mounted to the first junction end and to the second junction end. The first hinge assembly effectuates controlled pivoting movement of the first shell member and the second shell member with respect to each other whereby the first shell member and the second shell member are configurable in a first configuration in which the first axis and the second axis are spaced from an parallel to one another and in a second configuration in which the first axis and the second axis are collinear.

BRIEF DESCRIPTION OF THE DRAWINGS

The following detailed description makes reference to accompanying drawings wherein.

DETAILED DESCRIPTION OF AN EXEMPLARY EMBODIMENT

Figure 1:
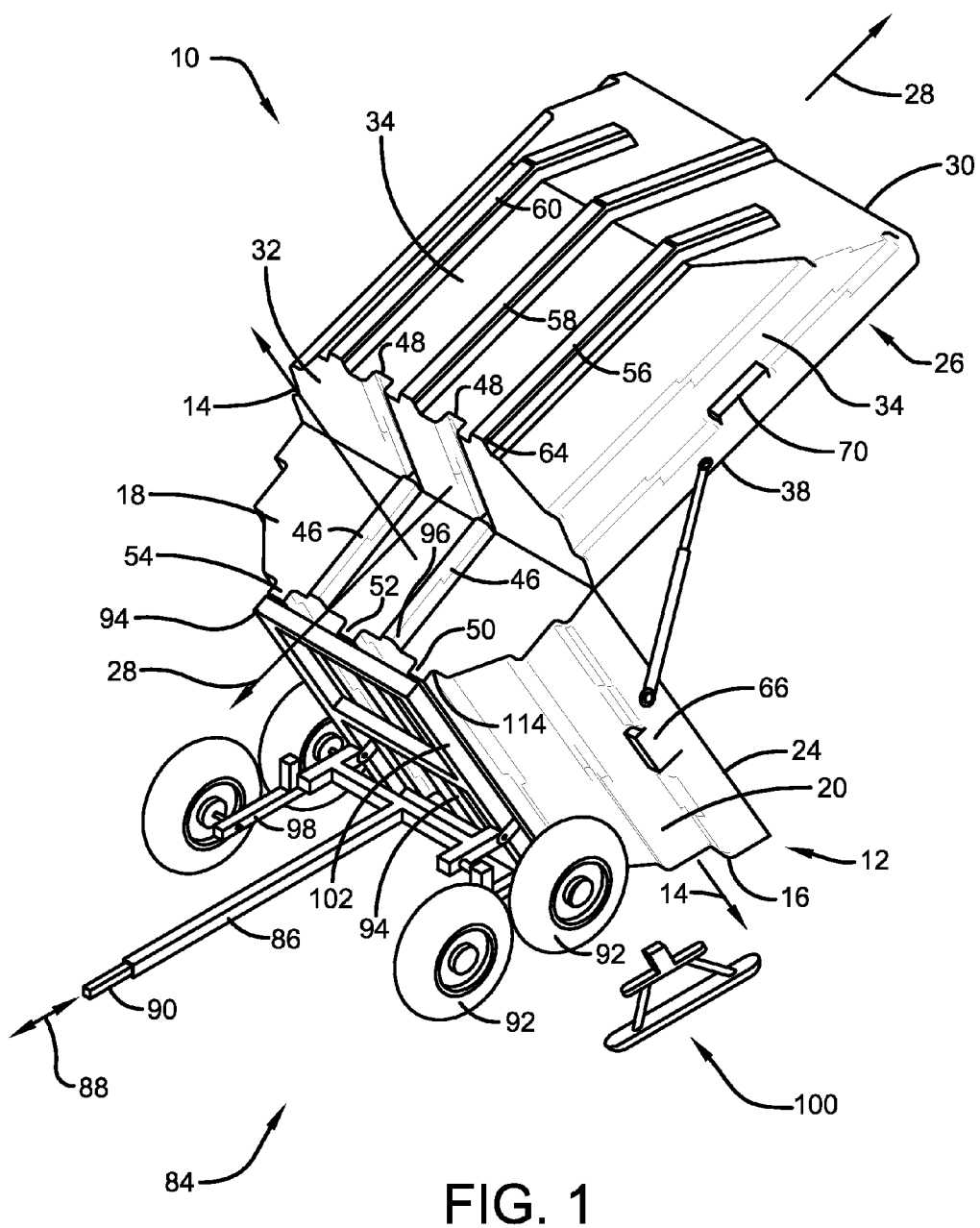
FIG. 1 is a first perspective view of a vehicle system according to an exemplary embodiment of the invention.

The invention, as demonstrated by the exemplary embodiment described below, provides a multi-purpose vehicle system that is able to be used as a covered trailer, dump trailer, jon boat, jon boat trailer, and toboggan. These functional attributes are all delivered in one, easy to use, durable package. A vehicle system according to one or more embodiments of the invention can allow the average outdoorsman and northern resident to achieve the versatility needed to fully experience all aspects of the wilderness without spending thousands of dollars or owning several different pieces of equipment.

In some embodiments, the vehicle system can be towed by an all-terrain vehicle that can be used selectively on land or in a body of water. In some embodiments, the vehicle system can be used as a covered ATV trailer to haul equipment, such as hunting or fishing equipment to and from favorite hunting or fishing areas, keeping equipment and supplies dry and protected. It is noted that other embodiments of the invention can be pulled by cars or trucks. In some embodiments, the vehicle system can be utilized as a tilting dump trailer for hauling wood, dirt, snow, etc. In some embodiments, the vehicle system can be used as 2 person jon boat, rated to 3 hp, that can be launched like bigger boats off its own trailer. Embodiments of the invention can optionally include a ski option as replacements for wheels. A vehicle system according to one or more embodiments of the invention can be used for hauling wood, supplies, etc, behind a snowmobile or an atv in the snow.

In trailer mode, a vehicle system according to one or more embodiments can be towed over most terrain by any motorized vehicle that has a ball hitch. First and second shell members can be hinged at the front and can have externally mounted shock absorbers. Both the hinges and shock absorbers can be quick-detaching, so the trailer may be used with one of the shell members without the other. The top shell member can be held closed over the bottom shell member via rubber tie-downs on the sides, such as at the rear. A heavy gasket can be disposed between the shell members to seal out the elements. A dump feature can be performed by releasing a locking spring pin located at the front of the trailer, on the hitch. The exemplary trailer can be dumped to a full sixty degrees for easy unloading and debris removal. In other embodiments, the trailer could be dumped to one or more angles over a range of thirty-ninety degrees.

The following steps can be performed in the exemplary embodiment to transform the vehicle system from trailer functionality to a boat. First, the outboard shocks can be removed if installed. Next, the hitch can be extended as the trailer remains attached to pulling vehicle. The top shell member can be swung away from the bottom shell member. Pin assemblies connecting the bottom shell member to the trailer can then be removed from one or more locations. These pins can be then inserted in apertures in the shells, fastening both members together. A motor can be attached to the rear shell member and the boat can be loaded with necessary gear. The boat can then be launched as one would launch any other small motor boat using the pulling vehicle and backing the trailer into the water. This process can be reversed to convert the boat back to a trailer.

In the accompanying drawings, an exemplary vehicle system is referenced at 10. The vehicle system 10 includes a first shell member 12 extending along a first axis 14 between a first stern wall or end 16 and a first junction wall or end 18. The first shell member 12 also includes a first hull wall 20 extending along the first axis 14, interconnecting the first stern end 16 and the first junction end 18. The first hull wall 20 and the first stern end 16 and the first junction end 18 cooperate to define a first volume 22 of space accessible through a first perimeter 24.

The vehicle system 10 also includes a second shell member 26 extending along a second axis 28 between a second stern end 30 and a second junction end 32. The second shell member 26 also includes a second hull wall 34 extending along the second axis 28, interconnecting the second stern end 30 and the second junction end 32. The second hull wall 34 and the second stern end 30 and the second junction end 32 cooperate to define a second volume 36 of space accessible through a second perimeter 38.

The exemplary first and second shell members 12, 26 can be molded. The exemplary first and second shell members 12, 26 can be double or single walled plastic structures. Other embodiments of the invention can be practiced with shell members formed from fiberglass, aluminum, wood, or steel.

Figure 2:
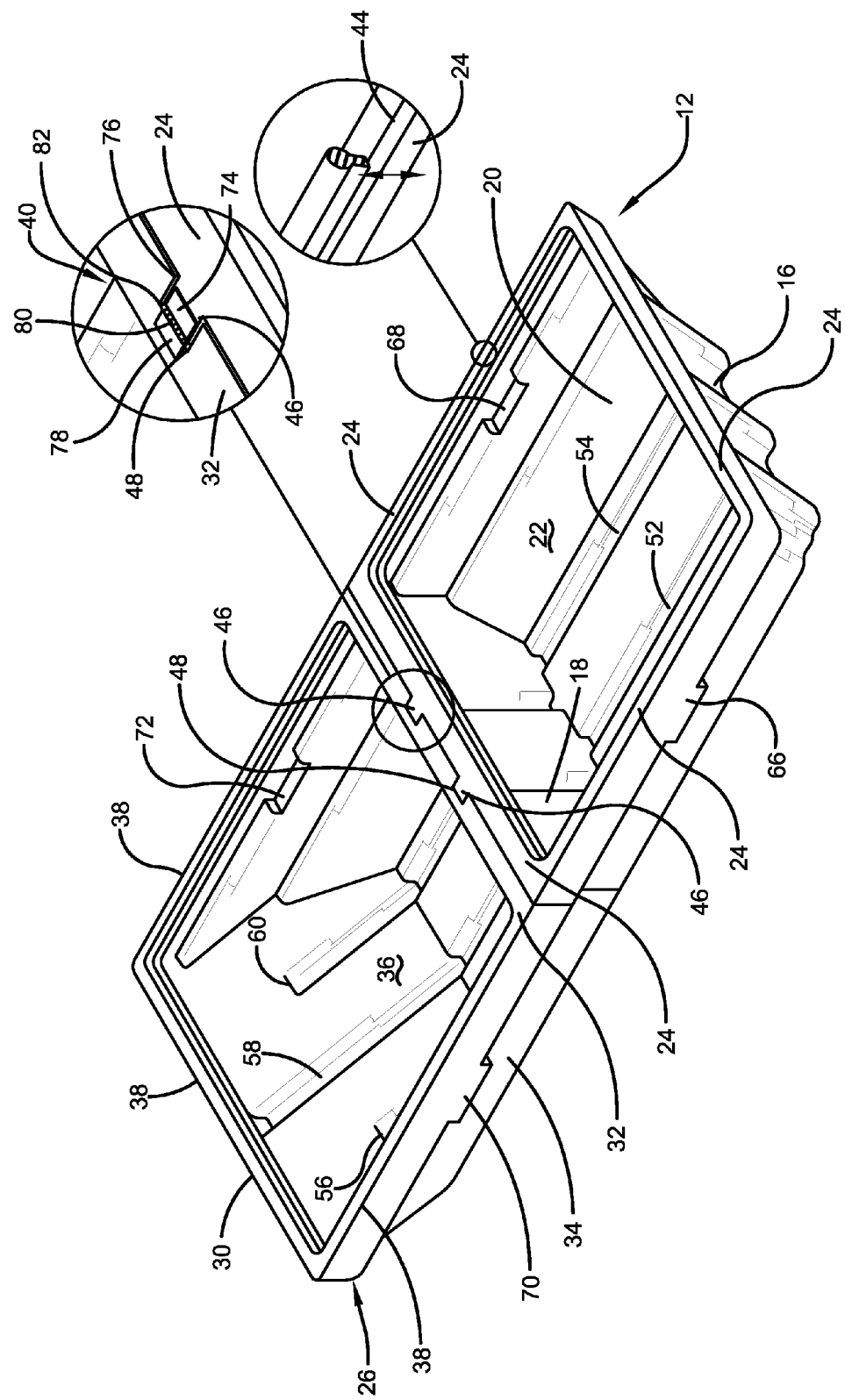
FIG. 2 is a perspective view of first and second shell members according to the exemplary embodiment of the invention.
Figure 3:
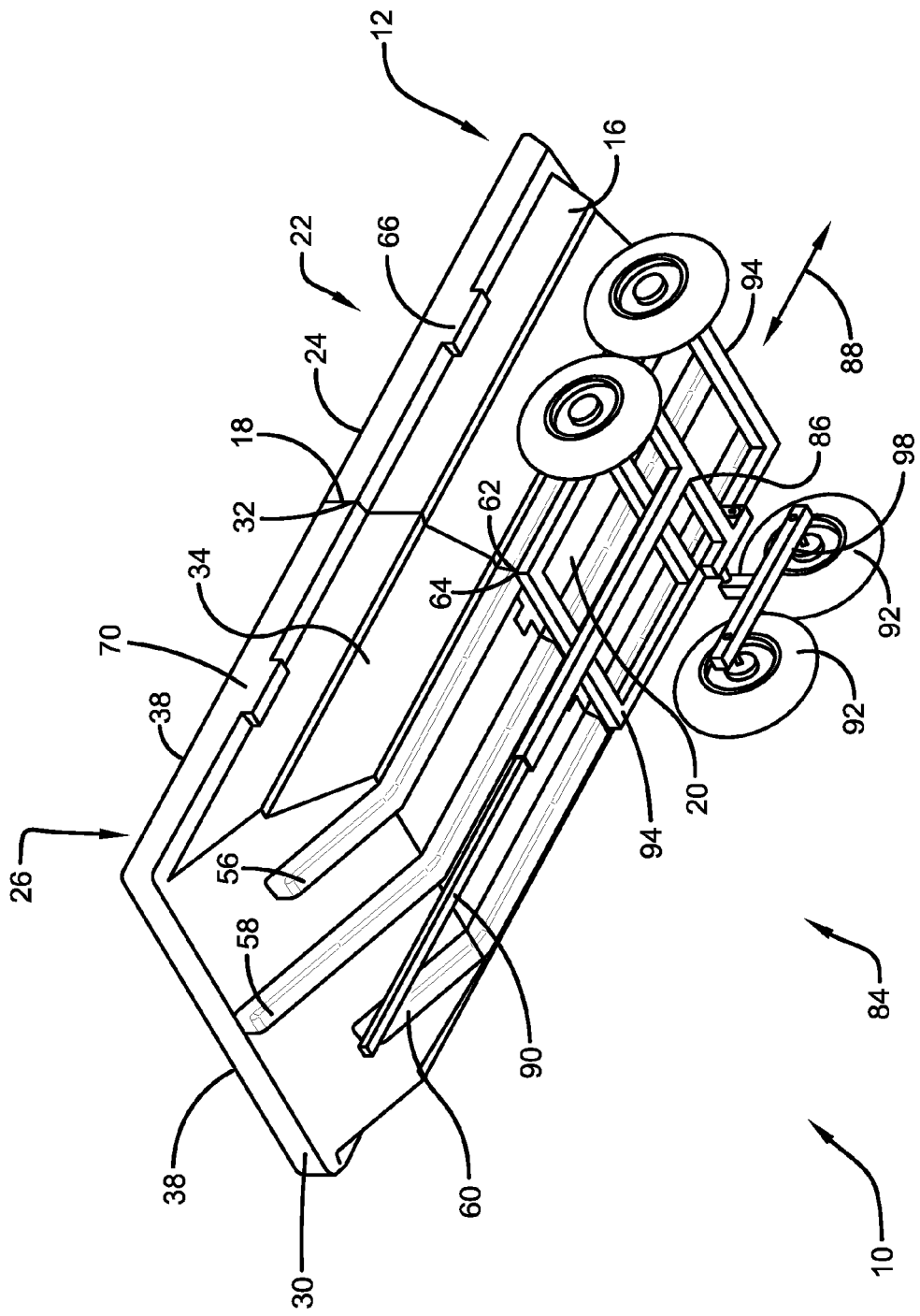
FIG. 3 is a second perspective view of a vehicle system according to the exemplary embodiment of the invention.

The vehicle system 10 also includes a first hinge assembly 40 interconnecting the first shell member 12 and the second shell member 26. The first hinge assembly 40 is mounted to the first junction end 18 and to the second junction end 32. The first hinge assembly 40 effectuates controlled pivoting movement of the first shell member 12 and the second shell member 26 with respect to each other whereby the first shell member 12 and the second shell member 26 are configurable in a first configuration in which the first axis 14 and the second axis 28 are spaced, and parallel to one another and in a second configuration in which the first axis 14 and the second axis 28 are collinear. FIGS. 2 and 3 show the first shell member 12 and the second shell member 26 in the second configuration. FIG. 1 shows the first shell member 12 and the second shell member 26 in a configuration transitioning between the first and second configurations.

The vehicle system 10 may also includes a gasket 42 mounted proximate to one of the first perimeter 24 and the second perimeter 38. The gasket 42 is uncompressed when the first shell member 12 and the second shell member 26 are in the second configuration and is compressed when the first shell member 12 and the second shell member 26 are in the first configuration. The gasket 42 can be compressed between the first perimeter 24 and the second perimeter 38. The gasket 42 can be removably engaged with the first shell member 12 and the second shell member 26. FIG. 1 shows an exemplary gasket 42 (sliced through to show the cross-section) releasibly positionable in a slot 44 defined in the first perimeter 24. The gasket 42 can thus be removed when not in use to reduce the likelihood of damage to the gasket 42, such as when the first shell member 12 and the second shell member 26 are used together as a boat.

The first shell member 12 can optionally include a plurality of ribs 46 each projecting from the first junction end 18 away from the first volume 22 of space. The second shell member 26 can optionally include a plurality of grooves 48 each recessed inwardly from the second junction end 32 toward the second volume 36 of space. Each of the plurality of ribs 46 can be received in one of the plurality grooves 48 when the first shell member 12 and the second shell member 26 are in the second configuration. This arrangement enhances the lateral stability of the boat formed by the first and second shell members 12, 26. Further, this reduces the stress placed on the hinge assembly 40 when the boat is in use.

The plurality of ribs 46 and/or the grooves 48 can be integrally-formed with respect to the first junction end 18 and the second junction end 32. "Integrally-formed" refers to the fact that in the exemplary embodiment the ribs are formed together rather than being formed separately and then subsequently joined. The term defines a structural feature since structures that are integrally-formed are structurally different than structures that are comprised of subcomponents formed separately and then subsequently joined. "Integral" means consisting or composed of parts that together constitute a whole and thus encompasses structures of more than one part wherein the parts are either integrally-formed or formed separately and then subsequently joined.

The first shell member 12 can optionally include a first plurality of ribs 50, 52, 54 each projecting from the first hull wall 20 away from the first volume 22 of space. The second shell member 26 can optionally include a second plurality of ribs 56, 58, 60 each projecting from the second hull wall 34 away from the second volume 36 of space. Each of the first plurality of ribs 50, 52, 54 can be aligned with one of the second plurality of ribs 56, 58, 60 when the first shell member 12 and the second shell member 26 are in the second configuration. The first plurality of ribs 50, 52, 54 can be integrally-formed with respect to the first hull wall 20 and the second plurality of ribs 56, 58, 60 can be integrally-formed with respect to the second hull wall 34. The ribs 50-60 can enhance the structure rigidity of the boat formed by the first and second shell members 12, 26. Further, one or more the ribs 50-60 can define structure features used to mount the respect shell member on a trailer assembly.

The first shell member 12 can optionally include a first plurality of receptacles 66, 68 each recessed into the first hull wall 20 within the first volume 22 of space. The second shell member 26 can optionally include a second plurality of receptacles 70, 72 each recessed into the second hull wall 34 within the second volume 36 of space. The first plurality of receptacles 66, 68 can be positioned closer to the first stern end 16 than the first junction end 18 and the second plurality of receptacles 70, 72 can be positioned closer to the second stern end 30 than the second junction end 32. The first plurality of receptacles 66, 68 can be integrally-formed with respect to the first hull wall 20 and the second plurality of receptacles 70, 72 can be integrally-formed with respect to the second hull wall 34. The receptacles 66-72 can receive boards or fabricated and molded components that define seats of the boat formed by the first and second shell members 12, 26. The positioning of the receptacles 66-72 can reduce the likelihood of collapse while the first shell member 12 and the second shell member 26 are in the second configuration, such as when in use as a boat. For example, the occupants can be seated further away from the junction of the first shell member 12 and the second shell member 26 to prevent the first shell member 12 and the second shell member 26 from returning to the first configuration as occupants enjoy the use of the first shell member 12 and second shell member 26 as a boat.

It is noted that embodiments of the invention can optionally include receptacles at other locations than are shown in the exemplary embodiment. It is also noted that embodiments of the invention can optionally include receptacles serving different purposes. For example, embodiments of the invention can optionally include receptacles that receive oars or fish-finders or engine mounts.

A first angle can be defined between a bottom portion or surface of the first hull wall 20 and the first stern end 16. In the exemplary embodiment, the first angle can be 60°. A second angle can be defined between a bottom portion or surface of the second hull wall 34 and the second stern end 30. In the exemplary embodiment, the second angle can be 30°. By differentiating the first angle from the second angle, one or more embodiments of the invention can concurrently maximize the amount of space available in the boat and enhance movement through water. For example, the amount of space available can be maximized by making the rear of the boat (whichever of the first shell member 12 and second shell member 26 that acts as the rear of the boat) wider and/or deeper that the front of the boat. Movement through water can be enhanced by forming the front of the boat with angle of lesser slope than the rear of the boat.

The first hinge assembly 40 can optionally include a first plate 74 mounted on the first shell member 12 and defining a first collar portion 76. The first hinge assembly 40 can also include a second plate 78 mounted on the second shell member 26 and defining a second collar portion 80. The first hinge assembly 40 can also include a hinge pin 82 insertable in both of the first collar portion 76 and the second collar portion 80. The hinge pin 82 can be accessible for removal when the first shell member 12 and the second shell member 26 are in the first configuration and when the first shell member 12 and the second shell member 26 are in the second configuration. By having the hinge pin 82 be accessible in either configuration, the first and second shell members 12, 26 can be easily separated, such when the vehicle system 10 is being used as hauler of goods or debris. In the exemplary embodiment, the second shell member 26 can be easily detached before the first shell member 12 is tilted for dumping. Other configurations of hinge assemblies can be applied in other embodiments of the invention.

The exemplary vehicle system 10 also includes a trailer assembly 84. The first shell member 12 can be directly mountable on the trailer assembly 84 and the second shell member 26 can be indirectly mountable on the trailer assembly 84 through the first hinge assembly 40. The exemplary trailer assembly 84 includes a first frame portion 86 extending along a trailer axis 88, a hitching shaft 90 engaged with the first frame portion 86, a plurality of wheels 92 engageable with and supporting the first frame portion 86 during movement of the first frame portion 86, and a second frame portion 94 pivotally mounted on the first frame portion 86. In the exemplary embodiment, the rib 52 of the first shell member 12 further can be received in an optional track 96 of the second frame portion 94.

Figure 4:
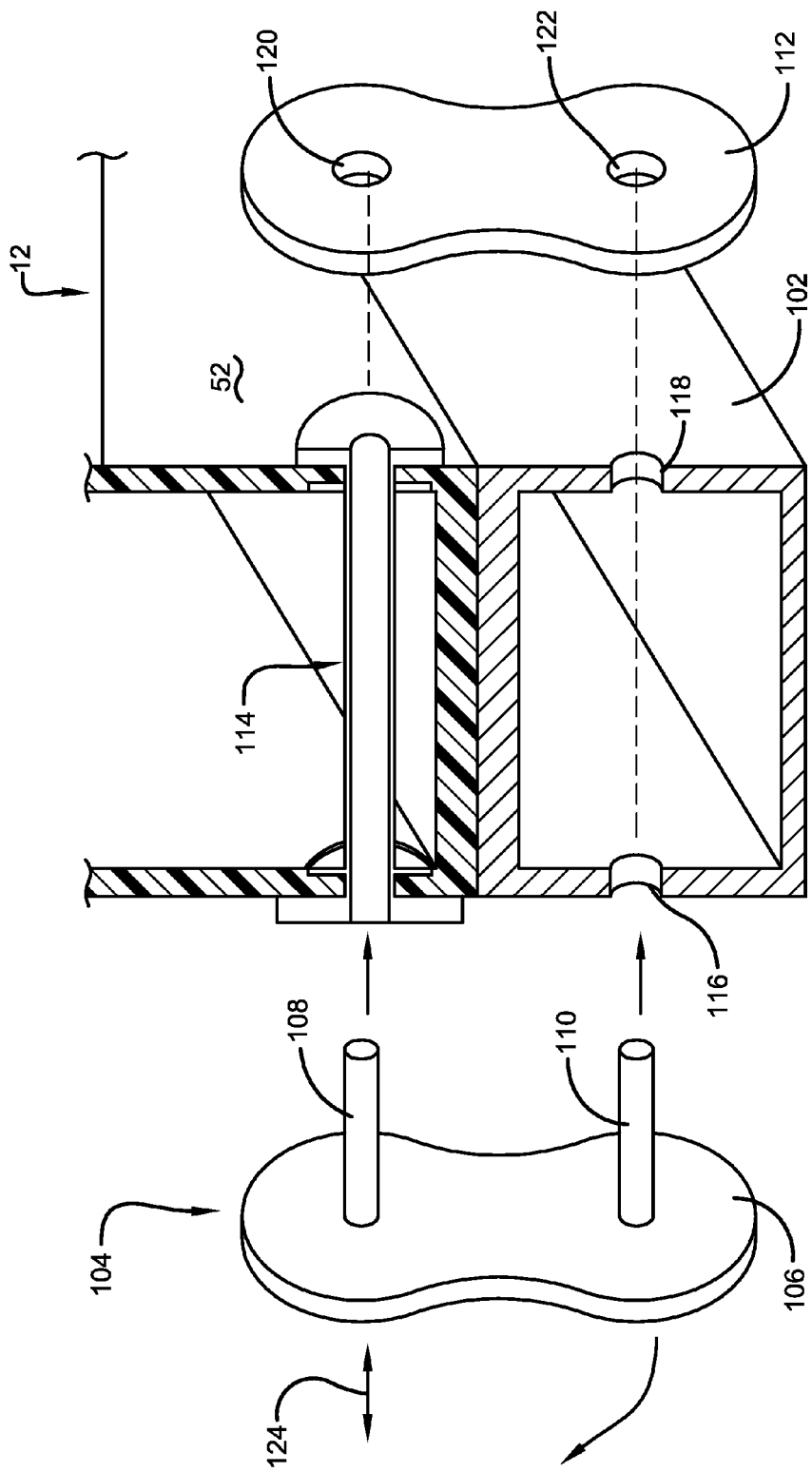
FIG. 4 is a partial cross-section showing a releasible interconnection between a first shell member and a portion of a trailer assembly according to the exemplary embodiment of the invention.

FIG. 4 shows a partial cross-section of a releasible interconnection between the first shell member 12 and a portion of the trailer assembly 84 according to the exemplary embodiment of the invention. As shown in FIG. 1, the rib 50 can rest on a beam 102 of the second frame portion 94. Referring again to FIG. 4, the exemplary embodiment can optionally include one or more connectors, such as, by way of example and not limitation, a chain link connector 104. The exemplary chain link connector 104 includes a base 106, stakes 108, 110, and an enclosing plate 112. The stakes 108, 110 are fixedly mounted on the base 106.

The first shell member 12 can be formed with sleeve 114 disposed in situ. This renders the joint between the first shell member 12 and the sleeve 114 water-tight. Apertures 116, 118 can be defined in the beam 102. The stakes 108 and 110 can be inserted in the sleeve 114 and apertures 116, 118, respectively, defined in the beam 102. The stakes 108 and 110 can also be inserted in apertures 120, 122, respectively, of the enclosing plate 112. The distal ends of the stakes 108, 110 can be formed to accommodate fasteners, such as having apertures to receive cotter pins or notches to receive spring clips. Such fasteners can be inserted on/in the stakes 108, 110 after the stakes 108, 110 have been inserted in the respective apertures/sleeves to releasibly affix the first shell member 12 to the trailer assembly 84. It is noted that embodiments of the invention can include as many mounting locations as desired. In the exemplary embodiment, two mounting locations are arranged at the junction end 18 and one at the stern end 16.

When the first and second shell members 12, 26 are arranged to form a boat, the connector 104 can initially be removed from the first shell member 12 and the trailer assembly 84. The first and second shell members 12, 26 can then be arranged in the second configuration. The second shell member 26 can have a sleeve 64 similar to the sleeve 114 associated with the first shell member 12. The sleeve 64 is referenced in FIG. 1 as mounted in the rib 56. The stake 108 can be inserted in the sleeve 114 and the stake 110 can be concurrently inserted in the sleeve 64. Thus, the connector 104 can be rotated about a central axis 124 of the stake 108 to switch from interconnecting the first shell member 12 and the trailer assembly 84 to interconnecting the first shell member 12 and the second shell member 26. Interconnecting the first shell member 12 and the second shell member 26 can prevent the collapse of the boat while the first shell member 12 and the second shell member 26 are in the second configuration.

The hitching shaft 90 can support a ball hitch (not shown). The hitching shaft 90 can be telescopically engaged with the first frame portion 86. This allows the hitching shaft 90 to be adjustably elongated, allowing the trailer assembly 84 to be pulled regardless of whether the first and second shell members 12, 26 are in the first configuration or the second configuration.

The wheels 92 can be engaged with the trailer assembly 84 through a walking beam axle 98 operably disposed between the plurality wheels 92 and the first frame portion 86. The walking beam axle 98 can disperse loads over two wheels rather than one wheel when traversing uneven terrain. It can provide a much smoother ride compared to having a single axle with one tire per side. Embodiments of the invention can be practiced with a single axle.

The hitching shaft 90 and the second frame portion 94 can be disposed at opposite ends of the first frame portion 86 along the trailer axis 88. The walking beam axle 98 can be engaged with the first frame portion 86 between the hitching shaft 90 and the second frame portion 94 along the trailer axis 88. This arrangement allows for flexibility in towing the vehicle system 10 under different circumstances, such as when the first and second shells 12, 26 are open with respect to each other, when the vehicle system 10 is being used to carry debris for dumping, or when enclosed cargo is being moved.

In some embodiments, the vehicle system 10 can optionally include a plurality of skis 100 operable to replace the plurality of wheels 92 and support the first frame portion 86. The skis 100 can be mounted on axles or can mount to the walking beam axle 98. The skis 100 can be desirable when the vehicle system 10 is to be moved through snow.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Further, the "invention" as that term is used in this document is what is claimed in the claims of this document. The right to claim elements and/or sub-combinations that are disclosed herein as other inventions in other patent documents is hereby unconditionally reserved.

What is claimed is:

1. A vehicle system comprising:
a first shell member extending along a first axis between a first stern end and a first junction end, wherein said first shell member also includes a first hull wall extending along said first axis, interconnecting said first stern end and said first junction end, and wherein said first hull wall and said first stern end and said first junction end cooperate to define a first volume of space accessible through a first perimeter;
a second shell member extending along a second axis between a second stern end and a second junction end, wherein said second shell member also includes a second hull wall extending along said second axis, interconnecting said second stern end and said second junction end, and wherein said second hull wall and said second stern end and said second junction end cooperate to define a second volume of space accessible through a second perimeter;
a first hinge assembly interconnecting said first shell member and said second shell member, wherein said first hinge assembly is mounted to said first junction end and to said second junction end, and wherein said first hinge assembly effectuates controlled pivoting movement of said first shell member and said second shell member with respect to each other whereby said first shell member and said second shell member are configurable in a first configuration in which said first axis and said second axis are spaced from and parallel to one another and in a second configuration in which said first axis and said second axis are collinear;
said first shell member further comprises a first plurality of ribs each projecting from said first hull wall away from said first volume of space;
said second shell member further comprises a second plurality of ribs each projecting from said second hull wall away from said second volume of space;
wherein each of said first plurality of ribs is aligned with one of said second plurality of ribs when said first shell member and said second shell member are in said second configuration;
a first aperture disposed in one of said first plurality of ribs and positioned proximate to said first junction end; and
a second aperture disposed in one of said second plurality of ribs and positioned proximate to said second junction end; and
a chain link connector releasibly engageable with said first shell member and said second shell member, said chain link connector including a base and first and second stakes fixedly mounted to said base, wherein said first stake is received in said first aperture and said second stake is received in said second aperture when said first shell member and said second shell member are in said second configuration, and wherein at least one of said first stake and said second stake are removed from said first aperture and said second aperture when said first shell member and said second shell member are in said first configuration.

2. The vehicle system of claim 1 wherein:
said first shell member further comprises a third plurality of ribs each projecting from said first junction end away from said first volume of space;
said second shell member further comprises a plurality of grooves each recessed inwardly from said second junction end toward said second volume of space; and
wherein each of said third plurality of ribs is received in one of said plurality grooves when said first shell member and said second shell member are in said second configuration.

3. The vehicle system of claim 1 wherein:
said first shell member further comprises a first plurality of receptacles each recessed into said first hull wall within said first volume of space;
said second shell member further comprises a second plurality of receptacles each recessed into said second hull wall within said second volume of space; and
wherein said first plurality of receptacles are positioned closer to said first stern end than said first junction end and said second plurality of receptacles are positioned closer to said second stern end than said second junction end.

4. The vehicle system of claim 1 wherein:
a first angle is defined between a bottom portion of said first hull wall and said first stern end;
a second angle is defined between a bottom portion of said second hull wall and said second stern end; and
wherein said first angle is different than said second angle.

5. The vehicle system of claim 1 wherein said first hinge assembly further comprises:
a first plate mounted on said first shell member and defining a first collar portion;
a second plate mounted on said second shell member and defining a second collar portion; and
a hinge pin insertable in both of said first collar portion and said second collar portion, wherein said hinge pin is accessible for removal when said first shell member and said second shell member are in said first configuration and when said first shell member and said second shell member are in said second configuration.

6. The vehicle system of claim 1 further comprising:
a gasket mounted proximate to one of said first perimeter and said second perimeter, said gasket being uncompressed when said first shell member and said second shell member are in said second configuration and being compressed when said first shell member and said second shell member are in said first configuration.

7. The vehicle system of claim 6 wherein said gasket is further defined as removably engaged with said first shell member and said second shell member.

8. The vehicle system of claim 1 further comprising:
a trailer assembly, wherein one of said first shell member and said second shell member is directly mountable on said trailer assembly and the other of said first shell member and said second shell member is indirectly mountable on said trailer assembly through said first hinge assembly.

9. The vehicle system of claim 8 wherein:
said first shell member further comprises at least one rib each projecting from said first hull wall away from said first volume of space;
said trailer assembly includes a track; and wherein said at least one rib is received in said track when said first shell member is directly mounted on said trailer assembly.

10. The vehicle system of claim 8 further comprising:
a plurality of skis operable to replace said plurality of wheels and support said first frame portion.

11. A vehicle system comprising:
a first shell member extending along a first axis between a first stern end and a first junction end, wherein said first shell member also includes a first hull wall extending along said first axis, interconnecting said first stern end and said first junction end, and wherein said first hull wall and said first stern end and said first junction end cooperate to define a first volume of space accessible through a first perimeter;
a second shell member extending along a second axis between a second stern end and a second junction end, wherein said second shell member also includes a second hull wall extending along said second axis, interconnecting said second stern end and said second junction end, and wherein said second hull wall and said second stern end and said second junction end cooperate to define a second volume of space accessible through a second perimeter;
a first hinge assembly interconnecting said first shell member and said second shell member, wherein said first hinge assembly is mounted to said first junction end and to said second junction end, and wherein said first hinge assembly effectuates controlled pivoting movement of said first shell member and said second shell member with respect to each other whereby said first shell member and said second shell member are configurable in a first configuration in which said first axis and said second axis are spaced from and parallel to one another and in a second configuration in which said first axis and said second axis are collinear;
a trailer assembly, wherein one of said first shell member and said second shell member is directly mountable on said trailer assembly and the other of said first shell member and said second shell member is indirectly mountable on said trailer assembly through said first hinge assembly;
wherein said trailer assembly further comprises:
a first frame portion extending along a trailer axis;
a hitching shaft engaged with said first frame portion;
a plurality of wheels engageable with and supporting said first frame portion during movement of said first frame portion; and
a second frame portion pivotally mounted on said first frame portion; and
wherein said one of said first shell member and said second shell member is mounted on said second frame portion with a connector that interconnects said second frame portion and said one of said first shell member and second shell member in a first configuration and interconnects said first shell member and second shell member in a second configuration.

12. The vehicle system of claim 11 wherein:
said first shell member further comprises at least one rib projecting from said first junction end away from said first volume of space;
said second shell member further comprises at least one groove recessed inwardly from said second junction end toward said second volume of space; and
wherein said at least one rib is received in said at least one groove when said first shell member and said second shell member are in said second configuration.

13. The vehicle system of claim 8 wherein said hitching shaft is further defined as telescopically engaged with said first frame portion.

14. The vehicle system of claim 13 wherein said hitching shaft and said second frame portion are disposed at opposite ends of the first frame portion along said trailer axis.

15. The vehicle system of claim 14 further comprising:
a walking beam axle operably disposed between said plurality wheels and said first frame portion.

16. The vehicle system of claim 15 wherein said walking beam axle is engaged with said first frame portion between said hitching shaft and said second frame portion along said trailer axis.

17. A vehicle system comprising:
a first shell member extending along a first axis between a first stern end and a first junction end, wherein said first shell member also includes a first hull wall extending along said first axis, interconnecting said first stern end and said first junction end, and wherein said first hull wall and said first stern end and said first junction end cooperate to define a first volume of space accessible through a first perimeter;
a second shell member extending along a second axis between a second stern end and a second junction end, wherein said second shell member also includes a second hull wall extending along said second axis, interconnecting said second stern end and said second junction end, and wherein said second hull wall and said second stern end and said second junction end cooperate to define a second volume of space accessible through a second perimeter;
a first hinge assembly interconnecting said first shell member and said second shell member, wherein said first hinge assembly is mounted to said first junction end and to said second junction end, and wherein said first hinge assembly effectuates controlled pivoting movement of said first shell member and said second shell member with respect to each other whereby said first shell member and said second shell member are configurable in a first configuration in which said first axis and said second axis are spaced from and parallel to one another and in a second configuration in which said first axis and said second axis are collinear;
a trailer assembly, wherein one of said first shell member and said second shell member is directly mountable on said trailer assembly and the other of said first shell member and said second shell member is indirectly mountable on said trailer assembly through said first hinge assembly;
wherein said one of said first shell member and said second shell member directly mountable on said trailer assembly further comprises at least one rib projecting away from said respective volume of space; and
at least one sleeve mounted in situ in said at least one rib of said one of said first shell member and said second shell member directly mountable on said trailer assembly, said at least one sleeve passing through one of said first volume of space and said second volume of space.

* * * * *